Dec. 19, 1933.  F. J. BULLOCK  1,940,531
FEEDING MECHANISM FOR ROUGHAGE GRINDERS, ENSILAGE CUTTERS, AND THE LIKE
Filed July 30, 1930
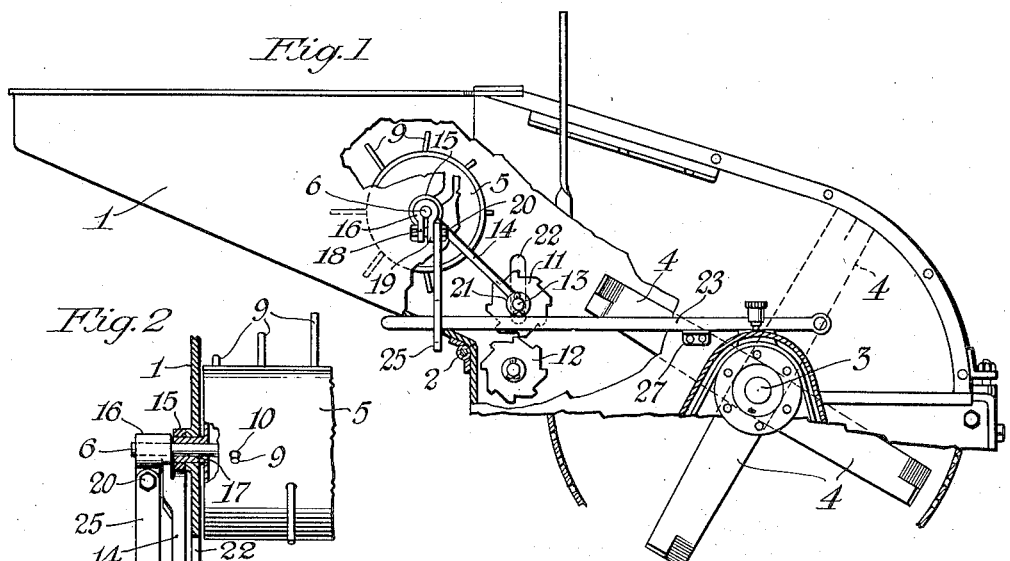
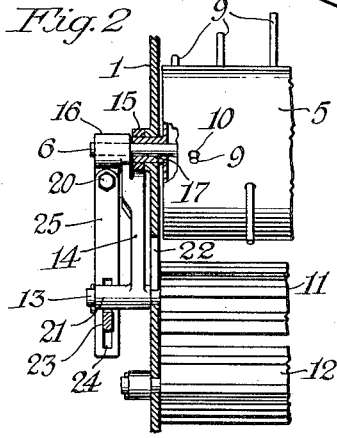
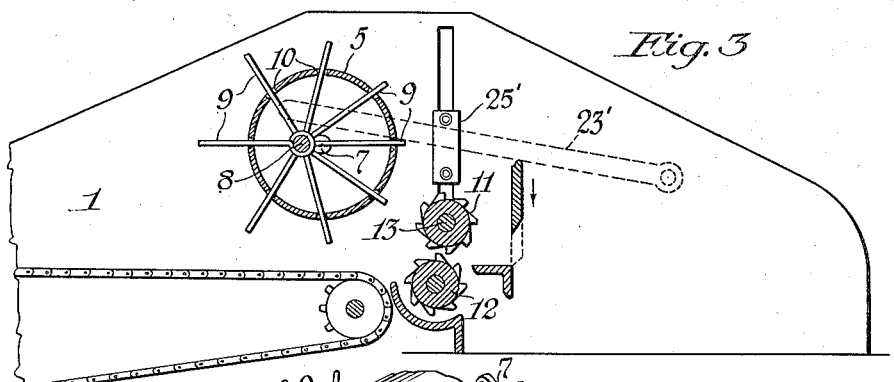
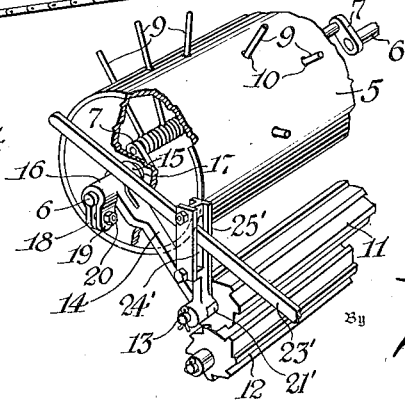
Inventor:
Fred J. Bullock,
By
Attorneys.

Patented Dec. 19, 1933

1,940,531

UNITED STATES PATENT OFFICE 1,940,531

FEEDING MECHANISM FOR ROUGHAGE GRINDERS, ENSILAGE CUTTERS, AND THE LIKE

Fred J. Bullock, Shortsville, N. Y., assignor to Papec Machine Company, Shortsville, N. Y., a corporation of New York Application July 30, 1930. Serial No. 471,806

1 Claim. (Cl. 146—118)

This invention relates to feeding mechanism designed primarily for use in "roughage" or impact grinders, though applicable also to ensilage cutters, hay and straw cutters, and the like, and is in the nature of an improvement upon or further development of that disclosed in Letters Patent No. 1,168,932, granted to F. J. Bullock and F. F. Billings, and dated January 18, 1916, to which reference may be made for details not set forth herein because not forming part of the present invention.

The improvement consists in a novel construction and arrangement of parts whereby the horizontal drum or cylinder overhanging the delivery end of the feed board, trough, or other support for the material handled, is made free to rise and fall, and thus to adapt itself to the depth of material moving over the support; and whereby further, said drum is enabled to climb upon or raise itself above any relatively thick or blunt-ended mass, such as a section or "flake" of baled hay approaching said drum, and to carry upward with it the upper one of two co-acting horizontal feed rollers located on the delivery side of the drum, to afford proper passageway for the material between said rollers.

By way of explanation it is stated that a roughage or impact grinder may be described as comprising a suitable casing having a feed board or hopper which delivers the material to be reduced into a chamber having a perforate or foraminous concave bottom, with or without teeth or projections; and a rotatable horizontal shaft carrying radial hammer bars which, moving rapidly, contact with and cut, tear, or pulverize the material delivered into the chamber by the aid of feed rollers.

An ensilage cutter usually comprises a frame, a feed trough, at the delivery end of which is arranged a circular casing in which is mounted to rotate at high speed, a combined cutter and fan wheel, the cutting blades of which pass close to and co-act with a fixed cutter bar extending transversely across the delivery end of the feed trough, the fan blades serving to deliver the cut material by direct throwing, and by force of an air current which the fan blades produce, to and through a delivery pipe or stack.

Machines of both the classes mentioned require rapid and comparatively uniform delivery of the material treated, to the reducing devices, and unless such feed mechanism operates efficiently and without material or frequent interruptions, such machines are unsatisfactory, and do not justify the outlay involved in their purchase and operation. The mechanism now to be described operates effectively, and overcomes difficulties heretofore encountered in the practical use of such machines.

A preferred embodiment of the invention is illustrated in the accompanying drawing, which shows the mechanism as applied to a roughage grinder and to an ensilage cutter. In said drawing:

Fig. 1 is a side elevation of so much of a roughage grinder as is necessary to a clear understanding of the invention, portions of the structure being broken away and some shown in section;

Fig. 2 is a fragmentary elevation, partly in section, illustrating the manner of mounting and connecting the horizontal feed drum or cylinder with the upper roll of the paired feed rolls employed;

Fig. 3 is a vertical sectional elevation of the delivery end of the feed trough and conveyor belt of an ensilage cutter, equipped with the improved feeding mechanism;

Fig. 4 is a fragmentary perspective view, illustrating the preferred construction of the horizontal feed drum or cylinder, the mounting thereof, and the connections between said drum or cylinder and the upper one of the paired feed rolls;

Fig. 5 shows one of the fingers or rods carried by the rotary feed drum or cylinder.

Referring first to Figs. 1 and 2, the mechanism will be explained as applied to a roughage or impact grinder. The numeral 1 designates a side plate or wall of the hopper or feed board and top or cover portion of the grinder, which is commonly connected by a hinge joint 2 to the main frame or casing of the grinder so that it may be swung away therefrom to afford access to the rotary shaft 3 carrying the radial hammer bars 4, and to the concave and other parts beneath said shaft. Driving gears, belts, etc., of any usual construction, are provided for imparting rotation to the shaft 3, and to the drum and feed rolls later noted, but as these are of well known and variant construction and arrangement, they are not here shown.

The numeral 5 designates a hollow drum or cylinder, mounted concentrically with and free to rotate upon the axial portions or extensions 6 of a two-armed crank-like element 7, the eccentric cross rod 8 of which, corresponding to a crank pin, serves as a pivot for a series of rods or fingers 9. Said fingers are extended radially outward from the supporting rod 8, and pass through holes 10 formed in the circumferential shell or body of the drum 5. As best shown in Figs. 3 and 4, the double-armed crank element, comprising parts 6, 7 and 8, does not function as a crank through having the form thereof, but is held rigidly by its axial portions 6, about which drum 5 turns, to maintain the portion 8 in fixed position and eccentric to the axial portions 6. As the drum or cylinder 5 is of circular cross section, and is mounted concentrically with the axial members 6 of the crank-like element, the connecting member 8 is of course eccentric to the axial portions 6 and to the drum or cylinder 5. The rods or fingers 9 pivoted on member 8 and extending through the shell of the drum will thus be caused to swing or revolve about said member, and in doing so will be made to protrude furthest beyond the drum on that side which at the moment is nearest the member 8, and to a progressively lessened extent as a diametrically opposite point is approached.

On the delivery side of the drum 5 is located a pair of feed rolls 11 and 12, which receive between them and advance to the reducing devices, the material to be acted upon thereby. Pivotally mounted upon the ends of an axle 13 passing freely through said roll 11 and extending toward the axial members 6 of the crank-like rod support, are radius bars 14 divided at their drum-carrying ends to form two sleeves or collars 15 and 16, as best seen in Figs. 2 and 4. Each sleeve 15 encompasses one of the tubular journals 17 of the drum 5, and each of the sleeves 16 similarly encompasses one of the axial end portions 6 of the two-armed crank element. Each sleeve is split or divided longitudinally, as best seen in Figs. 1 and 4, and the divided portions are extended outwardly to form lugs 18 and 19 which are drawn together by a bolt 20, and caused to firmly clamp and hold against rotation the outer extremities of the axial portions 6 of the crank-like element. By this construction the rod 8 of the crank element may be set at any angular relation desired relative to the axis of the drum, and the points of greatest and least projection of the fingers or rods 9 beyond the shell of the drum may thus be determined. Each radius bar 14 is provided at its lower extremity with a tubular sleeve 21 to receive the axle 13 of the upper feed roll 11, about which axle the roll 11 is free to rotate, the axle 13 being extended through vertical slots 22 formed in the side walls of the hopper or feed trough of the machine.

It follows from the construction above set forth that if the upper roll 11 be assumed to be fixed in its lowermost position the axis of drum 5 is constrained to swing in an arc about the axis of roll 11.

To the end that the upper feed roll 11 may rise and fall more or less during the rise and fall of the drum 5, there is provided on each side of the machine a lever 23 pivoted or fulcrumed at one end to the frame or casing of the machine. In the case of the roughage grinder, the levers 23 extend beneath the sleeves 21 of the radius bars 14, in which sleeve the proximate end of the axle 13 is carried. The opposite end of axle 13 extends through a vertical slot 24 formed in a link 25 suspended from sleeve 16 of radius bar 14, to which its upper end may conveniently be connected by the sleeve-contracting bolt 26. The slotted link 25 and lever 23 thus serve as a lost motion connection between the drum 5 and feed roll 11, so arranged that as drum 5 swings upward from the lowest position it first moves independently, revolving about the axis of roll 11, and then upon further motion, picks up the roll 11 and causes it to rise also.

When the drum 5 is at its lowest adjustment, as when feeding a comparatively thin body or layer of material, each lever 23 rests upon a bracket 27, while the links 25, being slotted, are free to rise or fall a limited distance without acting upon said levers. When, however, the lower end wall of each slot 24 of the links 25 makes contact with the overlying sleeves 21 of the radius bars 14, further rise of drum 5 will, by reason of the links 25, raise the levers 23 and with them the sleeves 21 carrying the ends of axle 13 of upper feed roll 11. In this way the feed roll will, during the upper range of the rise of drum 5, be caused to rise with said drum, thus maintaining a proper relative opening between the feed rolls as related to the feeding space between drum 5 and the bottom of the trough or hopper through which the material is drawn to the feed rolls 11 and 12.

In the case of ensilage cutters, the levers 23' pass over the sleeves 15 or 16 at the upper ends of the radius bars 14, and through links 25' of slotted construction, permitting a certain amount of play of levers 23' independently of said links. The links 25' are guided in slots in the side walls of the feed trough, and are formed each with a sleeve 21', through which passes the axle 13 of the upper feed roll. It will be seen that under this construction the rise of the drum 5 and its radius bars causes the free end of levers 23' to be elevated, and through the links 25', to elevate the axle 13 of the upper feed roll and consequently the roll itself, after the levers 23' encounter the upper end wall of the slots 24' of the links 25'. The action is to all intents and purposes identical with that of the mechanism first above described in connection with the roughage or impact grinder, and accomplishes the same end.

In the drawing the crank-like element is represented as built up of axial portions 6, radial arms 7, and cross rod 8, but obviously an integral, bent, shaft-like member of iron or steel may be employed, both types of crank shaft being common in the art. In the case of the bent shaft, the fingers or rods 9 may have one end fashioned to form a closed eye, and be threaded over the rod 8. In the case of the built-up member, however, it is impracticable thus to thread the fingers upon the supporting rod 8; hence they are formed of round iron rods with one end bent to form an eye which is at first left open sufficiently to receive the rod 8, but is afterward closed to prevent escape from said rod, and to cause the eye to encircle rod 8 with only such clearance as is necessary to a free swinging or revolution of the fingers 9 about rod 8.

It is to be understood that the design and construction of parts herein described may be varied within the field of the engineer or mechanic as distinguished from that of the inventor, and that the usual range of materials is contemplated. Thus the radius bars, links, and related parts may be of forged iron or steel, structural steel, pressed steel, malleable cast iron, or in part of wood.

So, too, any usual feed trough or table, with or without a conveyor, may be employed to advance the material treated to the drum and feed rolls; the axial portions of the crank-like element which supports the rods or fingers of the drum may be of polygonal form and held in sockets of like form in the sleeves or collars 16; and similar variations may be made without departing from the spirit or scope of the invention.

What is claimed is:—

In a machine of the character described, feeding mechanism for advancing material to be reduced, said mechanism comprising a support for the material to be treated; a rotatable drum provided with fingers projecting from its peripheral surface and overhanging the delivery end of the support; a pair of feed rolls located on the delivery side of the drum, the upper feed roll of the pair being mounted for vertical movement toward and from the companion roll; radius bars carrying at opposite ends bearings to receive the journals of the drum and the upper feed roll, said radius bearings guiding said drum in swinging movements about the axis of said upper roll; levers fulcrumed upon a fixed portion of the structure; and links having lost motion connections with said levers, said links and levers being operatively connected one with the bearings for the drum and the other with the bearings for the upper roll.

FRED J. BULLOCK.